(12) United States Patent
Le Gall et al.

(10) Patent No.: US 7,255,388 B2
(45) Date of Patent: Aug. 14, 2007

(54) REINFORCING MEMBERS

(75) Inventors: Eric Le Gall, Strasbourg (FR);
Jean-Philippe Lutz, Strasbourg (FR);
Serge Bieber, Haegen (FR)

(73) Assignee: Zephyros, Inc., Romeo, MI (US)

( * ) Notice: Subject to any disclaimer, the term of this patent is extended or adjusted under 35 U.S.C. 154(b) by 143 days.

(21) Appl. No.: 10/840,538

(22) Filed: May 6, 2004

(65) Prior Publication Data

US 2004/0256888 A1    Dec. 23, 2004

(30) Foreign Application Priority Data

May 8, 2003   (GB)  ................................ 0310524.4

(51) Int. Cl.
*B60N 3/00*     (2006.01)
(52) U.S. Cl. .............................. 296/187.02; 296/146.5; 296/193.05; 296/203.03; 296/146.8; 296/106
(58) Field of Classification Search ........... 296/187.02, 296/146.5, 193.05, 203.03, 146.8, 106
See application file for complete search history.

(56) References Cited

U.S. PATENT DOCUMENTS

| | | |
|---|---|---|
| 3,868,796 A | 3/1975 | Bush |
| 4,378,395 A | 3/1983 | Asoshina et al. |
| 4,440,434 A | 4/1984 | Celli |
| 4,444,818 A | 4/1984 | Tominaga et al. |
| 4,451,518 A | 5/1984 | Miura et al. |
| 4,463,870 A | 8/1984 | Coburn, Jr. et al. |
| 4,476,183 A | 10/1984 | Holtrop et al. |
| 4,598,008 A | 7/1986 | Vogt et al. |
| 4,610,836 A | 9/1986 | Wycech |
| 4,751,249 A | 6/1988 | Wycech |
| 4,769,391 A | 9/1988 | Wycech |
| 4,769,951 A | 9/1988 | Kaaden |
| 4,803,105 A | 2/1989 | Kretow et al. |
| 4,813,690 A | 3/1989 | Coburn, Jr. |
| 4,822,011 A | 4/1989 | Goldbach et al. |
| 4,836,516 A | 6/1989 | Wycech |

(Continued)

FOREIGN PATENT DOCUMENTS

DE           40 28 895 C1     2/1992

(Continued)

OTHER PUBLICATIONS

Copending U.S. Appl. No. 09/631,211, filed Aug. 3, 2000.

(Continued)

*Primary Examiner*—Stephen Gordon
(74) *Attorney, Agent, or Firm*—Dobrusin & Thennisch PC

(57) ABSTRACT

A structural reinforcement for a hollow section at least part of at least one of whose surfaces is the internal surface of an external panel comprising a rigid reinforcing member having a shape that substantially conforms to the cross section to be reinforced. An expandable adhesive material is provided over a portion of the surface of the rigid reinforcing member and the shape of the rigid reinforcing member and the amount and location of the expandable adhesive is such that upon foaming the foam contacts and bonds to the internal surfaces of the hollow section other than the interior surface of the external panel. In this way deformation of the external body panel during the foaming and/or cooling of the foamed expandable material is reduced or prevented.

20 Claims, 3 Drawing Sheets

U.S. PATENT DOCUMENTS

| | | | |
|---|---|---|---|
| 4,853,270 A | 8/1989 | Wycech |
| 4,861,097 A | 8/1989 | Wycech |
| 4,923,902 A | 5/1990 | Wycech |
| 4,978,562 A | 12/1990 | Wycech |
| 5,102,188 A | 4/1992 | Yamane |
| 5,124,186 A | 6/1992 | Wycech |
| 5,213,391 A | 5/1993 | Takagi |
| 5,358,397 A | 10/1994 | Ligon et al. |
| 5,506,025 A | 4/1996 | Otto et al. |
| 5,544,930 A | 8/1996 | Stedman |
| 5,577,784 A | 11/1996 | Nelson |
| 5,631,027 A | 5/1997 | Takabatake |
| 5,660,116 A | 8/1997 | Dannawi et al. |
| 5,707,098 A | 1/1998 | Uchida et al. |
| 5,725,272 A | 3/1998 | Jones |
| 5,755,486 A | 5/1998 | Wycech |
| 5,841,081 A | 11/1998 | Thompson et al. |
| 5,858,521 A | 1/1999 | Okuda et al. |
| 5,888,600 A | 3/1999 | Wycech |
| 5,892,187 A | 4/1999 | Patrick |
| 5,985,435 A | 11/1999 | Czaplicki et al. |
| 5,992,923 A | 11/1999 | Wycech |
| 6,003,274 A * | 12/1999 | Wycech |
| 6,006,484 A | 12/1999 | Geissbuhler |
| 6,033,300 A | 3/2000 | Schneider |
| 6,068,424 A | 5/2000 | Wycech |
| 6,079,180 A | 6/2000 | Wycech |
| 6,092,864 A | 7/2000 | Wycech et al. |
| 6,096,403 A | 8/2000 | Wycech et al. |
| 6,099,948 A | 8/2000 | Paver, Jr. |
| 6,103,341 A | 8/2000 | Barz et al. |
| 6,131,897 A | 10/2000 | Barz et al. |
| 6,135,541 A | 10/2000 | Geise et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche |
| 6,199,940 B1 | 3/2001 | Hopton et al. |
| 6,207,244 B1 | 3/2001 | Hesch |
| 6,224,992 B1 | 5/2001 | Delbeke et al. |
| 6,233,826 B1 | 5/2001 | Wycech |
| 6,237,304 B1 | 5/2001 | Wycech |
| 6,244,601 B1 | 6/2001 | Buchholz et al. |
| 6,253,524 B1 | 7/2001 | Hopton et al. |
| 6,263,635 B1 | 7/2001 | Czaplicki |
| 6,267,436 B1 | 7/2001 | Takahara |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,305,136 B1 | 10/2001 | Hopton et al. |
| 6,309,985 B1 | 10/2001 | Virnelson et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,455,144 B1 | 9/2002 | Wycech |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,478,367 B2 | 11/2002 | Ishikawa |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,550,847 B2 | 4/2003 | Honda et al. |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,607,831 B2 | 8/2003 | Ho et al. |
| 6,619,727 B1 | 9/2003 | Barz et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,691,468 B2 | 2/2004 | Helferty |
| 6,692,347 B1 | 2/2004 | Schneider |
| 6,706,222 B2 | 3/2004 | Gallagher et al. |
| 6,708,979 B2 | 3/2004 | Stratman et al. |
| 6,729,425 B2 | 5/2004 | Schneider et al. |
| 6,748,667 B2 | 6/2004 | Sevastian |
| 6,777,049 B2 | 8/2004 | Sheldon et al. |
| 6,786,533 B2 | 9/2004 | Bock et al. |
| 6,790,520 B1 | 9/2004 | Todd et al. |
| 6,793,274 B2 | 9/2004 | Riley et al. |
| 6,811,864 B2 | 11/2004 | Czaplicki et al. |
| 6,817,654 B2 | 11/2004 | Kitagawa et al. |
| 6,820,923 B1 | 11/2004 | Bock |
| 6,846,559 B2 | 1/2005 | Czaplicki et al. |
| 6,851,232 B1 | 2/2005 | Schwegler |
| 6,855,652 B2 | 2/2005 | Hable et al. |
| 6,880,657 B2 | 4/2005 | Schneider et al. |
| 6,887,914 B2 | 5/2005 | Czaplicki et al. |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,921,130 B2 | 7/2005 | Barz et al. |
| 6,923,499 B2 | 8/2005 | Wieber et al. |
| 6,928,736 B2 | 8/2005 | Czaplicki et al. |
| 6,932,421 B2 | 8/2005 | Barz et al. |
| 6,938,947 B2 | 9/2005 | Barz et al. |
| 6,941,719 B2 * | 9/2005 | Busseuil et al. |
| 6,953,219 B2 | 10/2005 | Lutz et al. |
| 6,955,593 B2 | 10/2005 | Lewis et al. |
| 7,025,409 B2 | 4/2006 | Riley et al. |
| 7,077,460 B2 | 7/2006 | Czaplicki et al. |
| 2002/0053179 A1 | 5/2002 | Wycech |
| 2002/0074827 A1 | 6/2002 | Fitzgerald et al. |
| 2002/0160130 A1 | 10/2002 | Sheldon et al. |
| 2002/0174954 A1 | 11/2002 | Busseuil et al. |
| 2003/0001469 A1 | 1/2003 | Hankins et al. |
| 2003/0039792 A1 | 2/2003 | Hable et al. |
| 2003/0050352 A1 | 3/2003 | Guenther et al. |
| 2003/0057737 A1 | 3/2003 | Bock et al. |
| 2003/0069335 A1 | 4/2003 | Czaplicki et al. |
| 2003/0090129 A1 | 5/2003 | Riley et al. |
| 2003/0140671 A1 | 7/2003 | Lande et al. |
| 2003/0144409 A1 | 7/2003 | Kassa et al. |

| | | | |
|---|---|---|---|
| 2003/0176128 A1 | 9/2003 | Czaplicki et al. | |
| 2003/0183317 A1 | 10/2003 | Czaplicki et al. | |
| 2003/0184121 A1 | 10/2003 | Czaplicki et al. | |
| 2003/0186049 A1 | 10/2003 | Czaplicki et al. | |
| 2003/0201572 A1 | 10/2003 | Coon et al. | |
| 2003/0218019 A1 | 11/2003 | Le Gall et al. | |
| 2004/0011282 A1 | 1/2004 | Myers et al. | |
| 2004/0018341 A1 | 1/2004 | Richardson et al. | |
| 2004/0018353 A1 | 1/2004 | Czaplicki et al. | |
| 2004/0033344 A1 | 2/2004 | Czaplicki et al. | |
| 2004/0034982 A1 | 2/2004 | Wieber et al. | |
| 2004/0046423 A1 | 3/2004 | Wieber | |
| 2004/0051251 A1 | 3/2004 | Hankins et al. | |
| 2004/0056472 A1 | 3/2004 | Schneider | |
| 2004/0074150 A1 | 4/2004 | Wycech | |
| 2004/0075299 A1 | 4/2004 | Wieber et al. | |
| 2004/0076831 A1 | 4/2004 | Hable | |
| 2004/0079478 A1 | 4/2004 | Merz | |
| 2004/0124553 A1 | 7/2004 | Czaplicki et al. | |
| 2004/0135058 A1 | 7/2004 | Wycech | |
| 2004/0143969 A1 | 7/2004 | Czaplicki | |
| 2004/0212220 A1 | 10/2004 | Riley et al. | |
| 2004/0217626 A1 | 11/2004 | Barz et al. | |
| 2004/0227377 A1 | 11/2004 | Gray | |
| 2004/0256888 A1 | 12/2004 | Le Gall et al. | |
| 2005/0016807 A1 | 1/2005 | Braymand | |
| 2005/0058787 A1 | 3/2005 | Ishikawa et al. | |
| 2005/0081383 A1 | 4/2005 | Kosal et al. | |
| 2005/0082111 A1 | 4/2005 | Weber | |
| 2005/0102815 A1 | 5/2005 | Larsen | |
| 2005/0126286 A1 | 6/2005 | Hable et al. | |
| 2005/0127145 A1 | 6/2005 | Czaplicki et al. | |
| 2005/0159531 A1 | 7/2005 | Ferng | |
| 2005/0166532 A1 | 8/2005 | Barz | |
| 2005/0172486 A1 | 8/2005 | Carlson et al. | |
| 2005/0194706 A1 | 9/2005 | Kosal et al. | |
| 2005/0212326 A1 | 9/2005 | Marion | |
| 2005/0212332 A1 | 9/2005 | Sheldon et al. | |
| 2005/0217785 A1 | 10/2005 | Hable et al. | |
| 2005/0218697 A1 | 10/2005 | Barz et al. | |
| 2005/0230165 A1 | 10/2005 | Thomas et al. | |
| 2005/0241756 A1 | 11/2005 | Harthcock et al. | |
| 2005/0251988 A1 | 11/2005 | Mendiboure | |
| 2005/0260399 A1 | 11/2005 | Finerman | |
| 2005/0276970 A1 | 12/2005 | Busseuil et al. | |
| 2006/0006695 A1 | 1/2006 | Lutz et al. | |
| 2006/0061115 A1 | 3/2006 | Brennecke | |

FOREIGN PATENT DOCUMENTS

| | | |
|---|---|---|
| DE | 42 27 393 A1 | 3/1993 |
| DE | 42 26 988 A1 | 2/1994 |
| DE | 196 48 164 A1 | 5/1998 |
| DE | 197 03 429 A1 | 8/1998 |
| DE | 198 12 288 C1 | 5/1999 |
| DE | 198 56 255 C1 | 1/2000 |
| DE | 198 58 903 A1 | 6/2000 |
| EP | 0 061 131 A2 | 9/1982 |
| EP | 0 236 291 A2 | 9/1987 |
| EP | 0 360 214 A2 | 3/1990 |
| EP | 0 383 498 A2 | 8/1990 |
| EP | 0 679 501 A1 | 11/1995 |
| EP | 0611778 B1 | 9/1997 |
| EP | 0 891 918 A1 | 1/1999 |
| EP | 0 893 331 A1 | 1/1999 |
| EP | 0 893 332 A1 | 1/1999 |
| EP | 0 697 956 B1 | 6/1999 |
| EP | 1 072 647 A2 | 1/2001 |
| EP | 1 084 816 A2 | 3/2001 |
| EP | 1 134 126 B1 | 3/2001 |
| EP | 1 122 156 A2 | 8/2001 |
| EP | 1 031 496 B1 | 12/2001 |
| EP | 0 893 332 B1 | 3/2002 |
| EP | 1 256 512 A2 | 11/2002 |
| EP | 1 362 683 A2 | 11/2003 |
| EP | 1 362 769 A1 | 11/2003 |
| EP | 1 428 744 A1 | 6/2004 |
| EP | 1 475 295 A2 | 11/2004 |
| EP | 1 591 224 A1 | 2/2005 |
| FR | 2 749 263 A1 | 12/1997 |
| GB | 2 061 196 A | 5/1981 |
| GB | 2 375 328 A | 11/2002 |
| JP | 7-117728 | 5/1995 |
| JP | 2001-48055 | 2/2001 |
| JP | 2001-62833 | 3/2001 |
| JP | 2001-88739 | 4/2001 |
| JP | 2001-191949 A | 7/2001 |
| JP | 2001-199362 | 7/2001 |
| JP | 2002-120250 | 4/2002 |
| JP | 2002-362412 | 12/2002 |
| JP | 2003-226261 | 8/2003 |
| WO | WO95/32110 | 11/1995 |
| WO | WO97/02967 | 1/1997 |
| WO | WO97/43501 | 11/1997 |
| WO | WO98/50221 | 11/1998 |
| WO | WO99/08854 | 2/1999 |
| WO | WO99/28575 | 6/1999 |
| WO | WO99/48746 | 9/1999 |
| WO | WO99/50057 | 10/1999 |
| WO | WO99/61281 | 12/1999 |
| WO | WO 00/13958 | 3/2000 |
| WO | WO 00/17000 | 3/2000 |
| WO | WO 00/37243 | 6/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 01/10682 A1 | 2/2001 |
| WO | WO 01/54936 A1 | 8/2001 |
| WO | WO 01/71225 A1 | 9/2001 |
| WO | WO 01/83206 A1 | 11/2001 |
| WO | WO 01/88033 A1 | 11/2001 |
| WO | WO 02/055923 A2 | 7/2002 |
| WO | WO 03/042024 A1 | 5/2003 |
| WO | WO 03/051676 A1 | 6/2003 |
| WO | WO 03/093387 A1 | 11/2003 |
| WO | WO 2005/077634 A2 | 8/2005 |
| WO | WO 2005/113689 | 12/2005 |

OTHER PUBLICATIONS

Copending U.S. Appl. No. 10/646,439, filed Aug. 21, 2003.
Copending U.S. Appl. No. 10/712,069, filed Jan. 28, 2003.
Copending U.S. Appl. No. 10/783,326, filed Mar. 4, 2003.
Copending U.S. Appl. No. 10/822,406, filed Apr. 12, 2004.
Copending U.S. Appl. No. 10/430,993, filed May 7, 2003.
Copending U.K. Application Serial No. 0220945.0 filed Sep. 10, 2002.
Copending U.K. Application Serial No. 0300159.1 filed Jan. 6, 2003.
Copending U.K. Application Serial No. 0310524.4 filed May 8, 2003.
Klein, M. and Adam Opel AG, "Application of Structural Foam in the Body in White-Reinforcement Roof Rail Side of the OPEL ASTRA", VDI Berichte, pp. 227-249.
Born, Peter and Bernd Mayer, "Structural Bonding in Automotive Applications", AutoTechnology, Apr. 2004, pp. 44-47.
GB Search Report dated Sep. 25, 2003 for Application No. GB 0310524.4.
European Search Report dated Oct. 6, 2004 for Application No. EP 04 07 6373.
Hopton et al., Application of a Structural Reinforcing Material to Improve Vehicle NVH Characteristics.
Lilley et al., Comparison of Performed Acoustic Baffles and Two-Component Polyurethane Foams Cavities.

Lilley et al., A Comparison of NVH Treatmments for Vehicle Floorplan Applications.

Lilley et al., Vehicle Acoustic Solutions.

Mansour et al., Optimal Thickness for Vehicle Stiffness.

* cited by examiner

REINFORCING MEMBERS

CLAIM OF BENEFIT OF FILING DATE

The present application claims the benefit of the filing date of U.K. Application Serial No. 0310524.4 filed May 8, 2003, hereby incorporated by reference.

FIELD OF INVENTION

The present invention relates to reinforcing materials and in particular to reinforcing materials that can be provided in hollow cross-sectional members particularly to provide reinforcement to improve the structural integrity of vehicles. The invention is particularly concerned with structural reinforcing materials that abut against the internal surface of external panels of the vehicle where the aesthetic appearance of the outer surface of the panel is important.

BACKGROUND OF INVENTION

Structural reinforcement can be provided by the provision of a reinforcing member within a hollow structure such as part of an automotive frame. It is known that the reinforcing member may comprise a core, typically a hollow core of metal or rigid plastic, carrying a structural adhesive foam. In the known processes the foam is expanded when heated to bridge the small gap between the core and the hollow structure so that the core is bonded to the hollow structure. Typically the nature of the structural adhesive foam is chosen so that it expands at the temperatures used to bake the coating that is applied to the hollow structure during the e-coat anti-corrosion coating technique widely used in the automobile industry.

It has not however been possible to apply these techniques to provide satisfactory reinforcement to those areas of an automobile where the reinforcement is to be provided behind the internal surface adjacent to external panels of the vehicle. This problem, sometimes known as read through, has arisen because the foam tends to shrink as it cools after foaming which can cause unsightly deformation of the external panels of the vehicle which tend to be made of thin flexible sheet metal.

The invention therefore provides a system whereby reinforcement can be provided to external panels of automobiles without causing deformation of the external surface of the external panel.

European Patent 1256512 addresses this problem and provides a cap to cover the foam in the areas that it contacts the outer panels. This cap is however expensive and can make the production and assembly of the part complicated.

The trends in motor vehicle design are towards lighter vehicles to improve fuel consumption. At the same time the safety standards and requirements are becoming more rigorous as indicated by the European Union requirements and the Euro-NCAP impact testing. The use of lighter materials such as aluminum to produce the hollow cross-sectional members that are used as vehicle sub frames has lead to the need for additional reinforcement. There is also a need for reinforcement behind external panels in various locations in the vehicle such as in window and door surrounds particularly in cavities between window and door frames and external panels such as in the reinforcement of hatchback doors and windscreen pillars where they connect with the roof of the vehicle.

There are four main types of application where structural reinforcement is required in vehicles. Crash protection where the prevention of vehicle body deformation is important to provide protection for the occupants. Energy absorption to enhance performance after yield. The reduction of flexing or body movement in the vehicle structure particularly to improve durability and reduce stress cracking and the point mobility problems requiring the reduction of resonance by the provision of stiffening. The need for reinforcement is present irrespective of the materials that are used to produce the vehicle structure and the need varies from material to material according to the nature of the reinforcement that is being provided. The reinforcing parts can also reduce the noise created by the motion of a vehicle by having a sound deadening effect as a result of blocking air paths in cavities.

It is known to provide longitudinal reinforcing structures within the hollow cross sections of vehicles. For example, PCT Publication WO97/43501 provides a beam, which can be mounted within the cross section to provide reinforcement along one axis in a hollow structure. The beam is provided with an expandable adhesive on two surfaces, which can be foamed upon heating to bond the beam to two opposed walls of the cross section. This technique is not suitable for use in the electrocoat process. Furthermore, the beam will only provide significant reinforcement along the axis of the beam. In WO97/43501 the beam with foamable material on opposed surfaces is placed in the cavity and subsequently foamed under the action of heat. This will result in uneven foaming and to non-uniform foam structures since on the underside the foam must raise the weight of the beam whereas expansion on the topside is free.

It is also known to provide foamable plastic molding within the hollow cross sections, these moldings can be foamed upon application of heat, such as is provided by the baking step in the electrocoat process, to provide a foamed baffle that fills the cross-section to provide sound adsorption. Such systems are described in European patent applications 0383498 and 0611778. The foam baffle provides sound deadening and vibration resistance. In these systems the entire insert is foamable and it is proposed that the foamable material be chosen so that it will foam during the baking process, which follows the electrocoat process typically used in vehicle manufacture to provide resistance to metal corrosion. The materials of these patents are not however reinforcing materials but are used to provide acoustic baffles and seals.

In the electrocoat process a vehicle structure is immersed in a bath of coating fluid from which an anticorrosion coating is deposited on the metal by electrolysis. The vehicle metal structure is subsequently heated to bake the coating on the metal. The electrocoat process is typically applied to complete vehicle structures in which hollow sections have been capped. Accordingly reinforcing structures are preferably provided within hollow sections prior to the electrocoat. It is therefore important that the reinforcing structure have minimal impact on the operation and efficiency of the electrocoat process.

A problem associated with both the reinforcing materials and the baffles is that if they are provided to produce foam adjacent to an external metal panel the shrinkage of the foam as it cools after expansion can cause undesirable deformation of the metal panel leading to imperfections in the outer surface of the vehicle.

There is therefore a need to provide structural reinforcement for the hollow cross-sections of vehicles, which is easily supplied, works well within the bounds of the electrocoat process, provides effective reinforcement to the vehicle both during operation and as crash protection and does not cause deformation of the external body panels of the vehicle during its manufacture.

DESCRIPTION OF THE INVENTION

Figure 1:
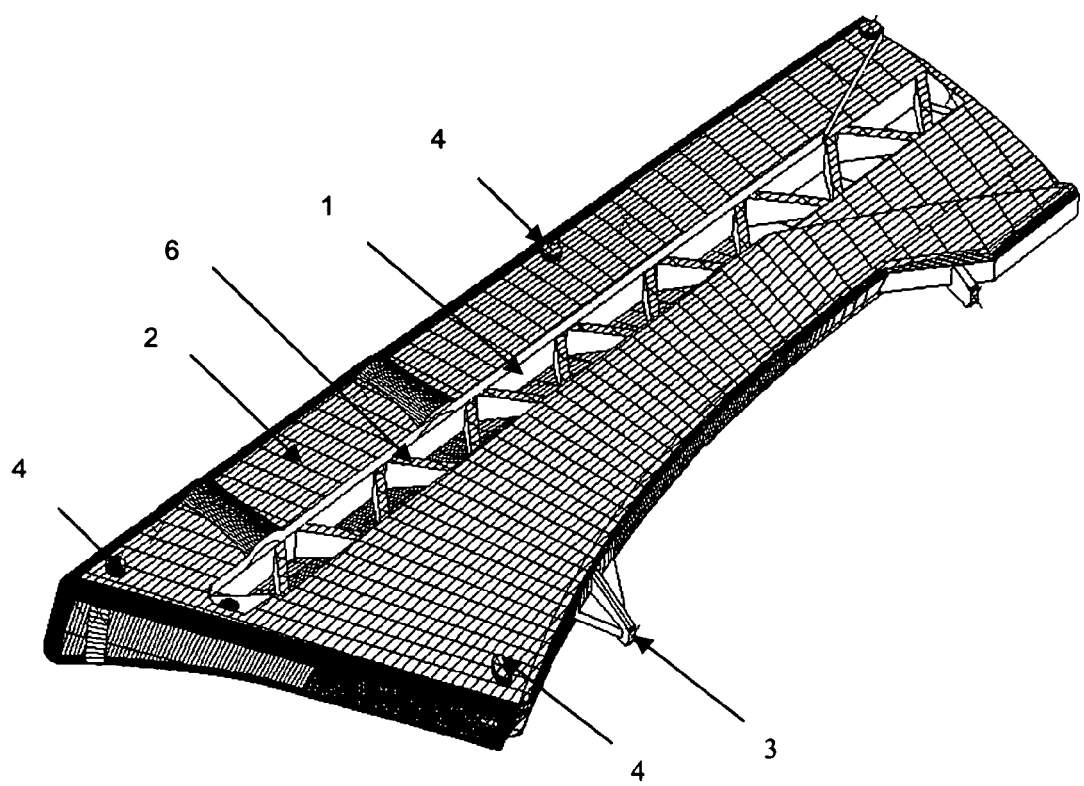
FIG. 1 is a perspective view of an exemplary reinforcing member according to the present invention.

The present invention therefore provides a structural reinforcement for a hollow section part of at least one of whose surfaces is an external panel comprising a rigid reinforcing member having a shape that substantially conforms to the cross section to be reinforced with an expandable adhesive material over a portion of the surface of said rigid reinforcing member wherein the combination of the shape of the rigid reinforcing and the location, size and shape of the expandable adhesive material is such that the material expands but does not contact the part of the surface that is an external panel.

In this way deformation of the external body panel during the foaming and/or cooling of the foamed expandable material is reduced or prevented.

The dimensions of the rigid reinforcing member and the thickness, location and nature of the expandable material are critical to the achievement of the desired structural reinforcement and to prevent deformation of the external body panel. The exterior shape of the reinforcing member should conform substantially to the cross section of the section of the structure it is designed to reinforce but it should be shaped so that the foam does not bear against the interior surface of the external body panel in a manner that will cause deformation of the panel. The shape of the reinforcing member may vary along its length as the dimensions of the cross section of the structure change. The size of the reinforcing member including the expandable adhesive material should be such that there is a small clearance between the extremity of the reinforcing member and the interior walls of the structure to be reinforced to allow for passage of the electrocoat fluid. Furthermore the reinforcing member should be shaped so that on expansion of the foam, the foam does not contact the entire interior surface of the external panel that forms part of the walls of the hollow structure. The foam should however contact and bond to other surfaces of the hollow structure so that the rigid reinforcing member is held firmly within the structure. The reinforcing member may have a cellular, honeycomb or ribbed internal structure to provide reinforcement along several different axes.

One or more of the walls of the hollow section that is reinforced according to the present invention may be entirely of the external panel. Similarly part of one or more walls of the hollow section may be provided by an internal structural member and another part of the walls of the hollow section may be provided by an external panel. Generally only one of the walls defining the hollow section is an external panel and it maybe that only part of one of the walls is an external panel. Accordingly in these circumstances the reinforcement may be provided according to the present invention by the expandable adhesive foam expanding and adhering to that part of the structural member which is not an external panel and not contacting and adhering to the part of the member that constitutes the external panel. In this instance reinforcement can be provided to the external panel by virtue of the proximity of the foam and/or the core of the structural reinforcing member to the external panel. This may be achieved by the appropriate distribution of the expandable adhesive material over the surface of the core and the provision of the appropriate amount of foamable material. The optimum distribution and amount of expandable material will depend upon the size and shape of the hollow section.

The structural reinforcing member needs to be located within the hollow section to be reinforced in a manner that enables satisfactory performance of the e-coat process without undesirable movement of the structural reinforcing member. Various means of attachment can be provided for example means such as clips may be molded in the core which can be clipped into holes formed in the walls of the hollow section other than the wall or walls which constitute the external panel. Similarly attachment means such as clips may be formed in the walls of the hollow section, other than the external panel, which can fit into holes in the core of the reinforcing member. Alternatively or additionally the structural reinforcing member may be provided with small lugs, which enable it to stand away from the interior walls of the hollow structure. In this way fastening devices may not be required and the area of contact between the structural reinforcing member and the interior walls of the frame of the vehicle is minimized. The lugs should not however contact the wall of the hollow structure that constitute the inner surface of the external panel.

The clearance between the extremity of the reinforcing member and the interior walls of the hollow section should be wide enough to enable the liquid used in the electrocoat bath to flow between the reinforcing member and the interior walls of the sections of the vehicle in sufficient quantity to enable an effective anti-corrosion coating to be deposited. On the other hand, the clearance must not be too wide since this can result in a lack of rigidity in the structure when the expandable adhesive is foamed to bond the structural reinforcing member to the walls of the hollow section other than the external panel. We prefer that the clearance be no more than 1 centimeter and is more preferably 3 to 10 millimeters. The clearance around the whole structure enables a more uniform foam structure to be obtained.

The rigid reinforcing member may be made from any suitable material, for example it may be made of metal or plastic and the material will be chosen according to the preferred fabrication method. This in turn is driven by economics and the complexity of the cross section to be reinforced. Reinforcing members for simple cross sections may be prepared by extrusion whilst injection moulding may be required for more complex structures. Metal members may be produced by stamping and/or forming. Where extrusion is used the members may be of metal or thermoplastics; where injection moulding is used thermoplastics are preferred. Polyamides, particularly glass filled polyamides are suitable materials due to their high strength to weight ratio. Alternatively injection moulding or die casting of metal alloys may be employed. It is preferred that the moulding is provided with means enabling fluid drainage. For example, holes may be provided in the moulding to allow the drainage of water, which may condense in the structure over time.

The preferred shape and structure of the reinforcing member will depend upon where it is to be located in the vehicle structure and the function it is to perform. The present invention is particularly useful in the reinforcement of areas around doors and windows and especially for the reinforcement of hatchbacks and particularly the upper extremity of a hatchback which is attached to the upper portion of the vehicle structure. It is also useful in the reinforcement of windscreen frames where they join with the roof of the vehicle which may be the external panel.

The expandable adhesive material serves two main functions, it will expand across the space between the reinforcing member and the interior of the hollow section without touching the inner surface of the exterior panel, the material will also bond to some or all of the interior walls of the hollow structure which do not constitute an external panel. Accordingly, expandable adhesive material means that the material can be activated to both expand (typically foam) and to act as an adhesive. Activation therefore enables the expandable material to expand and fill a gap between the reinforcing member and a hollow structure it is designed to reinforce and to bond to selected internal surfaces of the hollow structure. Accordingly the expandable adhesive must expand at the desired temperature and be sufficiently adhesive to firmly bond the reinforcing member inside the vehicle structure. Once foamed it should be sufficiently strong that it does not contribute any weakness to the overall reinforcing effect provided. The distribution of the foamable material over the reinforcing core is such that on and after foaming it will not cause deformation of the external panel. This is achieved according to this invention by minimizing the amount of contact between the foam and the internal surface of the external panel, the area of contact is preferably zero. We have found that by careful control it is possible to provide reinforcement to an external panel whilst leaving a small gap between the internal surface of the external panel and the foam. This ensures that as the foam cools and shrinks the thin metal sheet of the external panel is not deformed by the contraction of the foam.

Prior to activation, the expandable adhesive material is preferably dry and not tacky to the touch, since this facilitates shipping and handling and prevents contamination. Examples of preferred foamable materials include foamable epoxy-base resins and examples of such materials are the products L5206, L5207, L5208 and L5209, which are commercially available from L & L Products of Romeo Mich. USA, and the Betacore Products 5204, 5206, 5205 and 5208 available from Core Products, Strasbourg, France. The product should be chosen according to the rate of expansion and foam densities required. It is further preferred that it expand at the temperatures experienced in the electrocoat baking oven, typically 130° C. to 150° C.

The expandable adhesive material should be applied to at least a portion of the surface of the rigid reinforcing member that will be adjacent to an interior surface of the section of the vehicle frame that is to be reinforced whilst controlling the amount of foam adjacent to the external panel. It is preferred that the foamable material be applied over at least part of all the surfaces of the reinforcing member that are adjacent to the walls of the vehicle section and that the amount and location of foamable material applied over the surface of the reinforcing material adjacent to the internal surface of the external panel is controlled to prevent the foam causing deformation of the external panel. The optimum distribution will depend upon the shape of the section to be reinforced but the foam is preferably present so that it provides adhesion to two non-parallel surfaces to give rigidity in at least two dimensions. The expandable material may be applied to the rigid reinforcing member by bonding a strip of the material to the member, by extrusion coating or by injection moulding. Where the reinforcing member is made by injection moulding the expandable material may be applied by over-moulding or two shot injection moulding. The material should however be applied under conditions such that no foaming takes place.

The thickness of the expandable adhesive material and the degree of expansion must be controlled so that upon expansion the foam fills the space between the rigid reinforcing member and the hollow profile but the foam does not contact the internal surface of the external body panel to the extent that cooling of the expanded foam deforms the external body panel. This may be accomplished by providing no expandable material on the surface of the structural reinforcing material that is adjacent to the internal surface of the exterior panel or controlling the amount and thickness of the expandable material at the surface of the structural reinforcing material adjacent to the exterior panel so that, upon expansion, it is in close proximity to but touches no more than 50% of the area of interior face of the exterior panel and preferably does not touch the interior face of the exterior panel.

The hollow section with the reinforcing member in place may then be subjected to the electrocoat process in which it is passed through a bath of coating material and a corrosion resistant coating is deposited onto the structure by electrolysis. The vehicle structure is then dried in an oven to provide the final coating and the expandable adhesive is preferably chosen so that it is activated by the drying conditions used in the oven employed to bake the coating on the electrocoat process. In this way the expandable material will expand under the drying conditions to provide a foam that fills the space between the member and the interior walls and will produce a strong bond between the reinforcing member and the interior wall. Typically the coated structure is dried at around 165° C. for about 20 minutes and accordingly the adhesive should expand under these conditions. The industry is however looking to use lower drying temperatures and shorter drying times and this may influence the choice of expandable adhesive materials.

If other components for example bolts are to pass through the reinforcing members during subsequent assembly care must be taken to ensure that holes formed in the reinforcing member for the passage of the bolts are not blocked by the foam as it expands.

The techniques of the present invention may be used for the reinforcement of any construction that is based on a hollow frame structure in which at least part of one or more walls is an external panel. The techniques may for instance be used in the construction industry, in boats, in aircraft, and in railroad applications. They are however particularly useful to provide reinforcement in automobiles including cars, trucks, caravans and the like. The techniques are particularly useful in the current trend towards using lighter and sometimes weaker materials in the production of automobile sub frames where there is a greater need for reinforcement to compensate for the reduction in strength of the basic material and yet satisfy the safety requirements. This is particularly the case with the use of aluminum for the production of automobiles.

The present invention is illustrated by reference to the accompanying drawing which shows a structural reinforcement for use in providing reinforcement to vehicle windscreen pillars and their interaction with roof panels.

DESCRIPTION OF THE DRAWINGS

FIG. 1 shows a part comprising a core of moulded glass filled nylon (1) coated in most areas with a foamable material (2). The core is also provided with protrusions (3) whereby the part may be clipped into the wall of the hollow structure it is to reinforce. Small protrusions (4) are also formed in the frameable material which act as spaces between the core and the hollow structure to allow passage of the e-coat fluid. As is illustrated no foamable material is provided at the position (5) on the core which will lie against the inner surface of the external roof panel of the automobile when the part is in place. Ribs (6) are provided as part of the core (1) to provide additional reinforcement.

Figure 2:
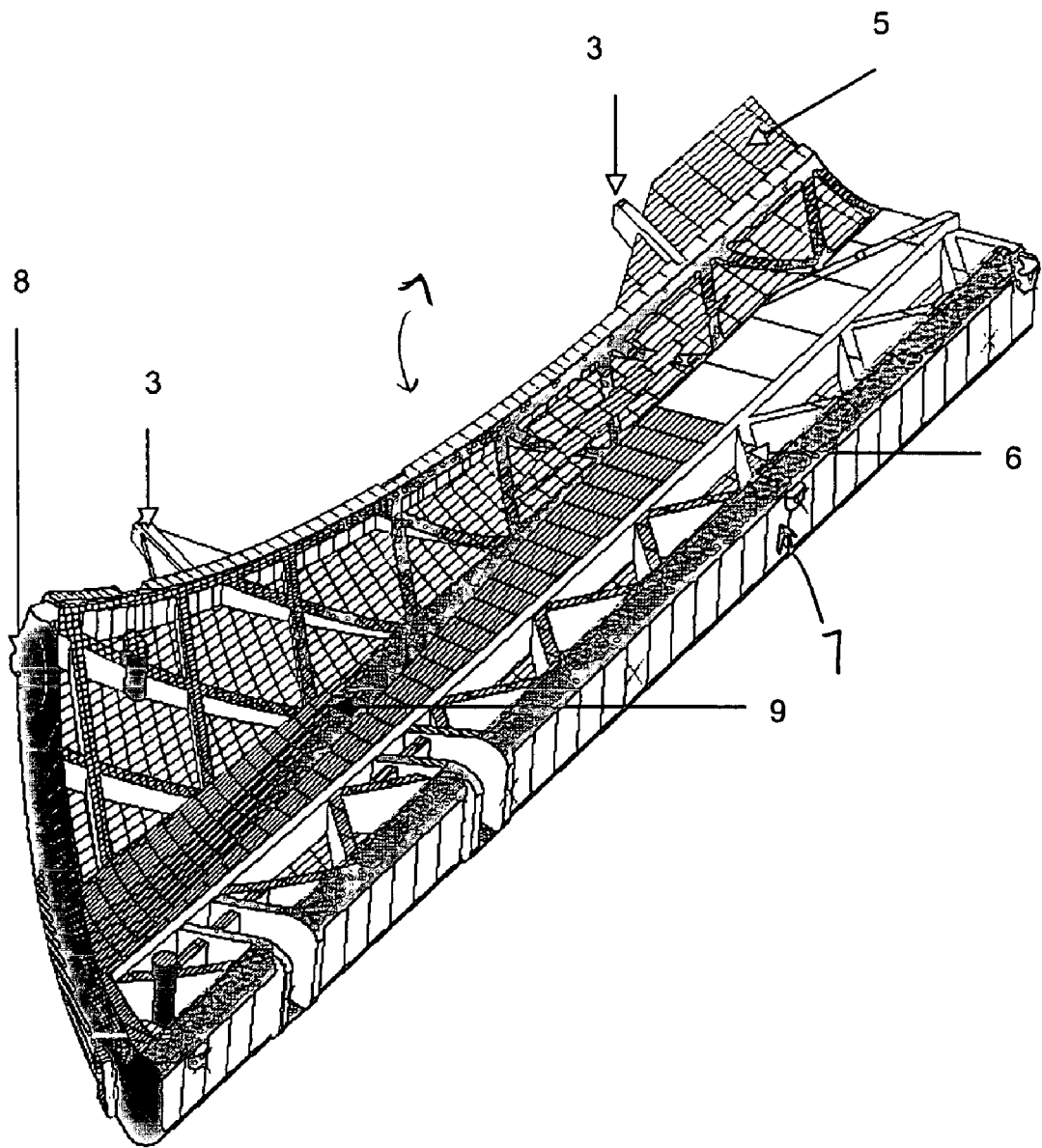
FIG. 2 is another perspective view of the exemplary reinforcing member of FIG. 1.

FIG. 2 is a view of the reverse side of the part shown in FIG. 1 showing how foamable material is provided along the sides of the core (7) and at one of the end (8) and a strip of foamable material (9) is provided down the inner surface of the core moulding.

Figure 3:
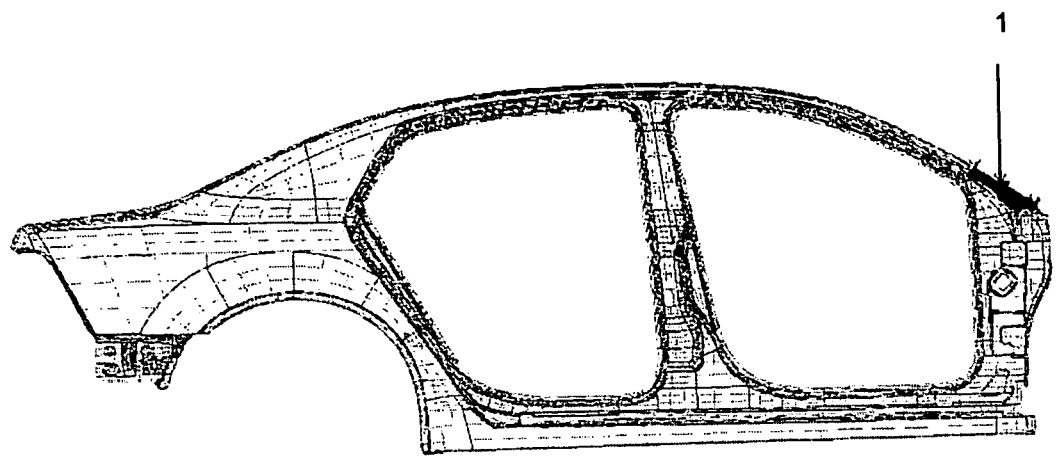
FIG. 3 is a side view of a portion of an automotive vehicle including the exemplary reinforcing member according to the present invention.
Figure 4:
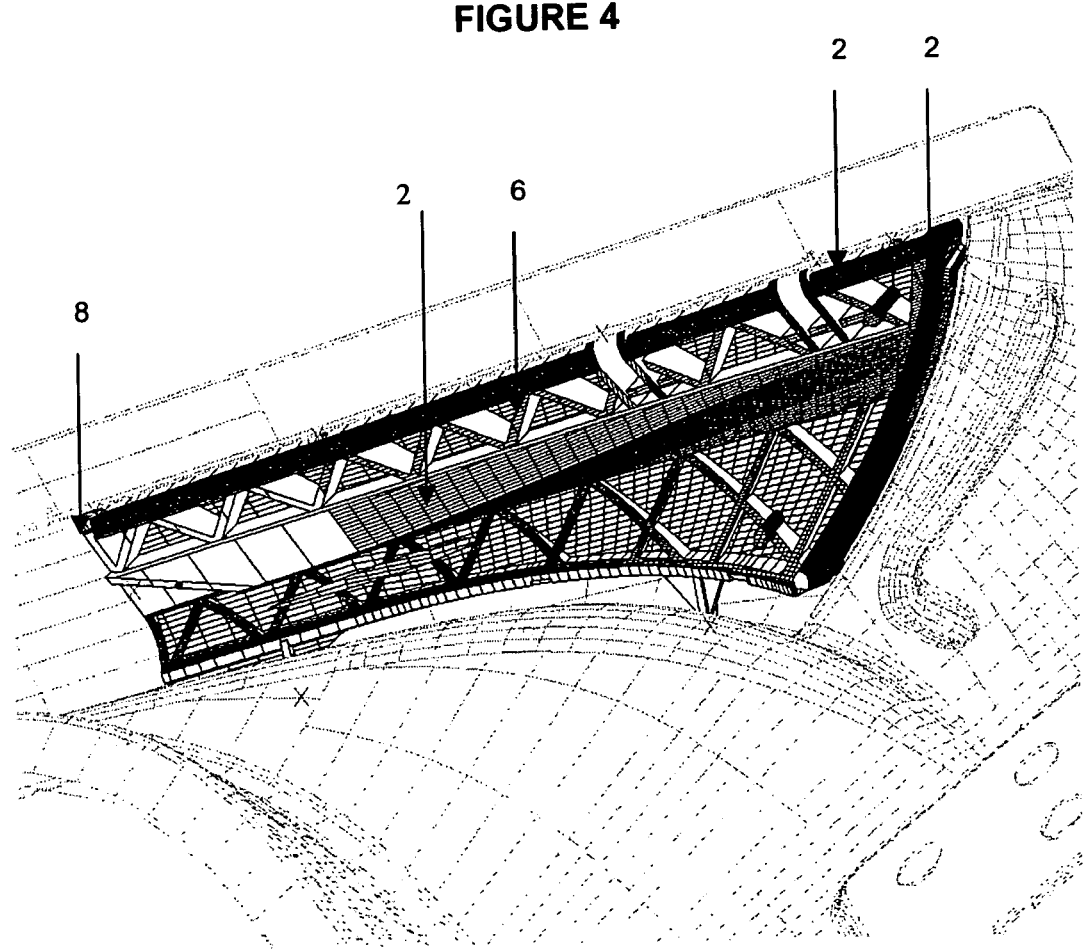
FIG. 4 is a perspective view of the exemplary reinforcing member applied to a portion of the vehicle.

FIG. 3 shows how the part (1) inserted in the windscreen support of a vehicle and FIG. 4 is an expanded view from the outside of the vehicle of the part installed according to FIG. 3 with the external panal (1) removed showing how the foamable material is separated from the internal surface of the external panel.

The invention claimed is:

1. A structural reinforcement system, comprising:
   a structure of an automotive vehicle, the structure including a plurality of walls at least partially defining a hollow section, the structure having an external surface that is part of an external body panel of the vehicle;
   a rigid reinforcing member having a shape that substantially conforms to a cross section of the hollow section of the structure;
   an expandable adhesive material over a portion of a surface of said rigid reinforcing member wherein:
   i) the rigid reinforcing member is shaped and the expandable adhesive is provided in an amount and distribution such that, upon expansion, the adhesive material contacts and adheres to at least part of the plurality of walls of the hollow section without contacting an inner surface of the external panel thereby avoiding unsightly deformation of the external surface that could otherwise be caused by shrinkage of the adhesive material; and
   ii) the reinforcing member is adhered to the plurality of walls of the structure by the expandable adhesive material expanding and adhering to an internal surface of the structure without adhering to the inner surface of the external panel.

2. A structural reinforcement system according to claim 1 wherein the size of the reinforcing member including the expandable adhesive material is such that there is a small clearance between an extremity of the reinforcing member and the plurality of walls of the structure to allow for passage of an electrocoat fluid.

3. A structural reinforcement system according to claim 1 wherein one or more of the plurality of walls of the hollow section of the structure is composed entirely of the inner surface of the external panel.

4. A structural reinforcement system according to claim 1 wherein at least part of one or more of the plurality of walls of the hollow section is provided by the inner surface of the external panel.

5. A structural reinforcement system according claim 1 wherein reinforcement is provided to the external panel by virtue of the proximity of the expandable material and the structural reinforcing member to the inner surface of the external panel.

6. A structural reinforcement system according to claim 1 wherein the rigid reinforcing member is without the expandable material on any of its surfaces that are adjacent to the inner surface of the external panel.

7. A structural reinforcement system according to claim 1 wherein at least a portion of the structure frames a portion of a vehicle door or window.

8. A structural reinforcement system according to claim 7 wherein the portion of the structure is an upper extremity of a hatchback door where the hatchback door is attached to the upper portion of the vehicle.

9. A structural reinforcement system, comprising:
   a structure of an automotive vehicle, the structure including a plurality of walls at least partially defining a hollow section, the structure having an external surface that is part of an external body panel of the vehicle;
   a rigid reinforcing member formed of metal or plastic and having a shape that substantially conforms to a cross section of the hollow section of the structure;
   an expandable adhesive material over a portion of a surface of said rigid reinforcing member wherein:
   i) the rigid reinforcing member is shaped and the expandable adhesive is provided in an amount and distribution such that, upon expansion, the adhesive material contacts and adheres to at least part of the plurality of walls of the hollow section without contacting an inner surface of the external panel;
   ii) the size of the reinforcing member including the expandable adhesive material is such that there is a small clearance between an extremity of the reinforcing member and the plurality of walls of the structure to allow for passage of an electrocoat fluid; and
   iii) the reinforcing member is adhered to the plurality of walls of the structure by the expandable adhesive material expanding and adhering to an internal surface of the structure without adhering to the inner surface of the external panel thereby avoiding unsightly deformation of the external surface that would otherwise be caused by shrinkage of the adhesive material.

10. A structural reinforcement system according to claim 9 wherein one or more of the plurality of walls of the hollow section of the structure is composed entirely of the inner surface of the external panel.

11. A structural reinforcement system according to claim 9 wherein at least part of one or more of the plurality of walls of the hollow section is provided by the inner surface of the external panel.

12. A structural reinforcement system according claim 9 wherein reinforcement is provided to the external panel by virtue of the proximity of the expandable material and the rigid reinforcing member to the inner surface of the external panel.

13. A structural reinforcement system according to claim 9 wherein the rigid reinforcing member is without the expandable material on any of its surfaces that are adjacent to the inner surface of the external panel.

14. A structural reinforcement system according to claim 9 wherein at least a portion of the structure frames a portion of a vehicle door or window.

15. A structural reinforcement system according to claim 14 wherein the portion of the structure is an upper extremity of a hatchback door where the hatchback door is attached to the upper portion of the vehicle.

16. A structural reinforcement system, comprising:
a structure of an automotive vehicle, the structure including a plurality of walls defining a hollow section, the structure having an external surface that is part of an external panel of the vehicle;
a rigid reinforcing member having a shape that substantially conforms to a cross section of the hollow section of the structure;
an expandable adhesive material over a portion of a surface of said rigid reinforcing member wherein:
i) the rigid reinforcing member is shaped and the expandable adhesive is provided in an amount and distribution such that, upon expansion, the adhesive material contacts and adheres to at least part of the plurality of walls of the hollow section without contacting an inner surface of the external panel;
ii) the size of the reinforcing member including the expandable adhesive material is such that there is a small clearance between an extremity of the reinforcing member and the plurality of walls of the structure to allow for passage of an electrocoat fluid;
iii) the reinforcing member is adhered to the plurality of walls of the structure by the expandable adhesive material expanding and adhering to an internal surface of the structure without adhering to the inner surface of the external panel;
iv) the rigid reinforcing member is without the expandable material on any of its surfaces that are adjacent to the inner surface of the external panel; and
v) at least a portion of the structure frames a portion of a vehicle door or window and the portion of the structure is an upper extremity of a hatchback door where the hatchback door is attached to the upper portion of the vehicle.

17. A structural reinforcement system according to claim 16 wherein one or more of the plurality of walls of the hollow section of the structure is composed entirely of the inner surface of the external panel.

18. A structural reinforcement system according to claim 1 wherein the external panel is an external roof panel of the vehicle.

19. A structural reinforcement system according to claim 1 wherein a portion of the reinforcing member lies against the inner surface of the external panel.

20. A structural reinforcement system according to claim 9 wherein the external panel is an external roof panel of the vehicle and wherein a portion of the reinforcing member lies against the inner surface of the external panel.

* * * * *